US012434129B1

(12) United States Patent
Johnson

(10) Patent No.: US 12,434,129 B1
(45) Date of Patent: Oct. 7, 2025

(54) TREASURE HUNT SCAVENGER GAME UTILIZING CANISTERS WITH NFC TAGS AND A SMARTPHONE

(71) Applicant: Aaron Johnson, Anchorage, AK (US)

(72) Inventor: Aaron Johnson, Anchorage, AK (US)

( * ) Notice: Subject to any disclaimer, the term of this patent is extended or adjusted under 35 U.S.C. 154(b) by 765 days.

(21) Appl. No.: 17/478,050

(22) Filed: Sep. 17, 2021

Related U.S. Application Data

(60) Provisional application No. 63/080,948, filed on Sep. 21, 2020.

(51) Int. Cl.

| | |
|---|---|
| ***A63F 3/00*** | (2006.01) |
| ***A63F 11/00*** | (2006.01) |
| ***A63F 13/216*** | (2014.01) |
| ***A63F 13/533*** | (2014.01) |
| ***A63F 13/655*** | (2014.01) |

(52) U.S. Cl.
CPC ...... *A63F 3/00145* (2013.01); *A63F 3/00643* (2013.01); *A63F 11/0074* (2013.01); *A63F 13/216* (2014.09); *A63F 13/533* (2014.09); *A63F 13/655* (2014.09); *A63F 2003/00996* (2013.01); *A63F 2300/308* (2013.01); *A63F 2300/695* (2013.01)

(58) Field of Classification Search
CPC .............. A63F 3/00145; A63F 3/00643; A63F 11/0074; A63F 13/216; A63F 13/533; A63F 13/655; A63F 2003/00996; A63F 2300/308; A63F 2300/695
See application file for complete search history.

(56) References Cited

U.S. PATENT DOCUMENTS 9,836,982 B1 * 12/2017 Harvey .................... G09B 5/00
10,737,169 B1 * 8/2020 Tilaye ................. A63F 13/5375
11,148,042 B2 * 10/2021 Tobin .................... A63F 13/216
2007/0188331 A1 * 8/2007 Kumagai ............... G06Q 30/02 235/492
2008/0234043 A1 * 9/2008 McCaskey ............. A63F 13/30 463/29
2008/0305860 A1 * 12/2008 Linner ................ G07F 17/3276 463/25
2009/0160618 A1 * 6/2009 Kumagai ............... G07G 1/009 340/10.1
2011/0201432 A1 * 8/2011 Waldock ................... A63F 9/24 463/36
2011/0244964 A1 * 10/2011 Glynne-Jones ....... A63F 13/327 463/40
2013/0191211 A1 * 7/2013 Nichols .................. G06Q 30/02 705/14.49
2014/0100935 A1 * 4/2014 Irish .................. G06Q 30/0225 705/14.26
2015/0174481 A1 * 6/2015 Tobin ...................... A63F 13/65 463/7

(Continued)

*Primary Examiner* — Carl V Larsen
(74) *Attorney, Agent, or Firm* — Michael Tavella

(57) ABSTRACT

A game that includes a game app and several physical containers that are hidden in various locations. A number of teams use the game app to find containers designated for that team to advance. The winning team is the team that finds all the containers assigned to it and reaches the finish line, or, when time runs out, the team that has the most containers. Finding a container assigned to another team does not count. A game master initially sets up the containers in various locations and sets up the other game parameters.

20 Claims, 7 Drawing Sheets

(56) References Cited

U.S. PATENT DOCUMENTS

| | | | | |
|---|---|---|---|---|
| 2017/0087453 | A1* | 3/2017 | Poisner | A63F 13/23 |
| 2019/0050882 | A1* | 2/2019 | Cohen | A63F 13/655 |
| 2019/0332912 | A1* | 10/2019 | Walker | G06K 7/10386 |
| 2020/0167699 | A1* | 5/2020 | Cohen | H04L 51/52 |
| 2020/0175140 | A1* | 6/2020 | Steele | A63F 13/65 |
| 2022/0032175 | A1* | 2/2022 | Watanabe | A63F 13/79 |
| 2023/0182027 | A1* | 6/2023 | Hardy | A63F 13/352<br>463/42 |

* cited by examiner

TREASURE HUNT SCAVENGER GAME UTILIZING CANISTERS WITH NFC TAGS AND A SMARTPHONE

CROSS REFERENCE TO RELATED APPLICATIONS

This application claims benefit of Provisional application 63/080,948 filed Sep. 21, 2020.

STATEMENT REGARDING FEDERALLY SPONSORED RESEARCH AND DEVELOPMENT

Not Applicable

BACKGROUND OF THE INVENTION

1. Field of the Invention

This invention relates to treasure hunt games and particularly to treasure hunt games using canisters with NFC tags and a smartphone to play.

2. Description of the Prior Art

Scavenger hunts have been popular for a long time. These hunts usually involve a group of people or teams with each having a list of items to find. The people go out and search for the items in various places (perhaps with the help of a map). The team that collects all or the most items wins.

BRIEF DESCRIPTION OF THE INVENTION

The invention is an electronic version of a scavenger hunt. The treasure hunt game combines Near Field Communication (NFC) tags, a smartphone app and NFC reader technology embedded in modern smartphones and several physical containers that are hidden in different locations. A number of teams use the game app to find containers designated for that team to advance. The winning team is the team that finds all the containers assigned to it and reaches the finish line, or, when time runs out, the team that has the most containers. Finding a container assigned to another team does not count. A game master initially sets up the containers in various locations and sets up the other game parameters.

DETAILED DESCRIPTION OF THE INVENTION

The invention is a treasure hunt game that combines Near Field Communication (NFC) tags, a smartphone app and NFC reader technology embedded in modern smartphones.

The game requires a game master to hide hollow plastic containers with an NFC tag embedded in the lid. After the game master hides the containers, he or she will snap a photo of the hiding place, edit the photo with some visual clues as to the hiding place and upload the photo through the "Findem' Tags" game application (app), which automatically links the GPS coordinates of the hiding spot with the photo of the hiding place. The game has a number of containers for each of the teams involved in the game. The game master tags a square on the game master game board to link that hiding spot to the game board and then moves to the next hiding spot. After hiding all the containers, the game master sets the game date and duration. The game master then alerts participants to download the "Findem' Tags" app and import a customized game code.

Players then see the game board and have a chance to choose and name a team. Once the game starts, players click on the start icon to receive the tag info page for their first location to hunt for the hidden container and a picture of the hiding spot. This starts the game clock. As each team finds a hidden container and scans the NFC tag, the players progress on the game board towards the finish line. The game is won when the first team that finds all the hidden tags and reaches the finish, or when time expires. If time expires with no team having reached the finish line, the team with the most found tags is deemed the winner.

To start the game process, a game master purchases a game set, which includes a set of hollow plastic containers. The containers for a designated course nest into each other. In the preferred embodiment, the set includes 5 stacks of containers, which allows for up to 25 hidden locations and up to 5 teams. Of course, the number of containers and teams can vary as desired. The game set also includes an instruction booklet, a code to register the app to that game kit, and that allots time to the game clock. The game clock holds the total amount of time that the game master can host games. In the preferred embodiment the purchase of a game set includes 10 hours of game time. This can be set so that one game that lasts for ten hours, two games of five hours each, or five games that last two hours each. Access to the game clock never expires; it can be recharged via an in-app purchase.

Figure 1:
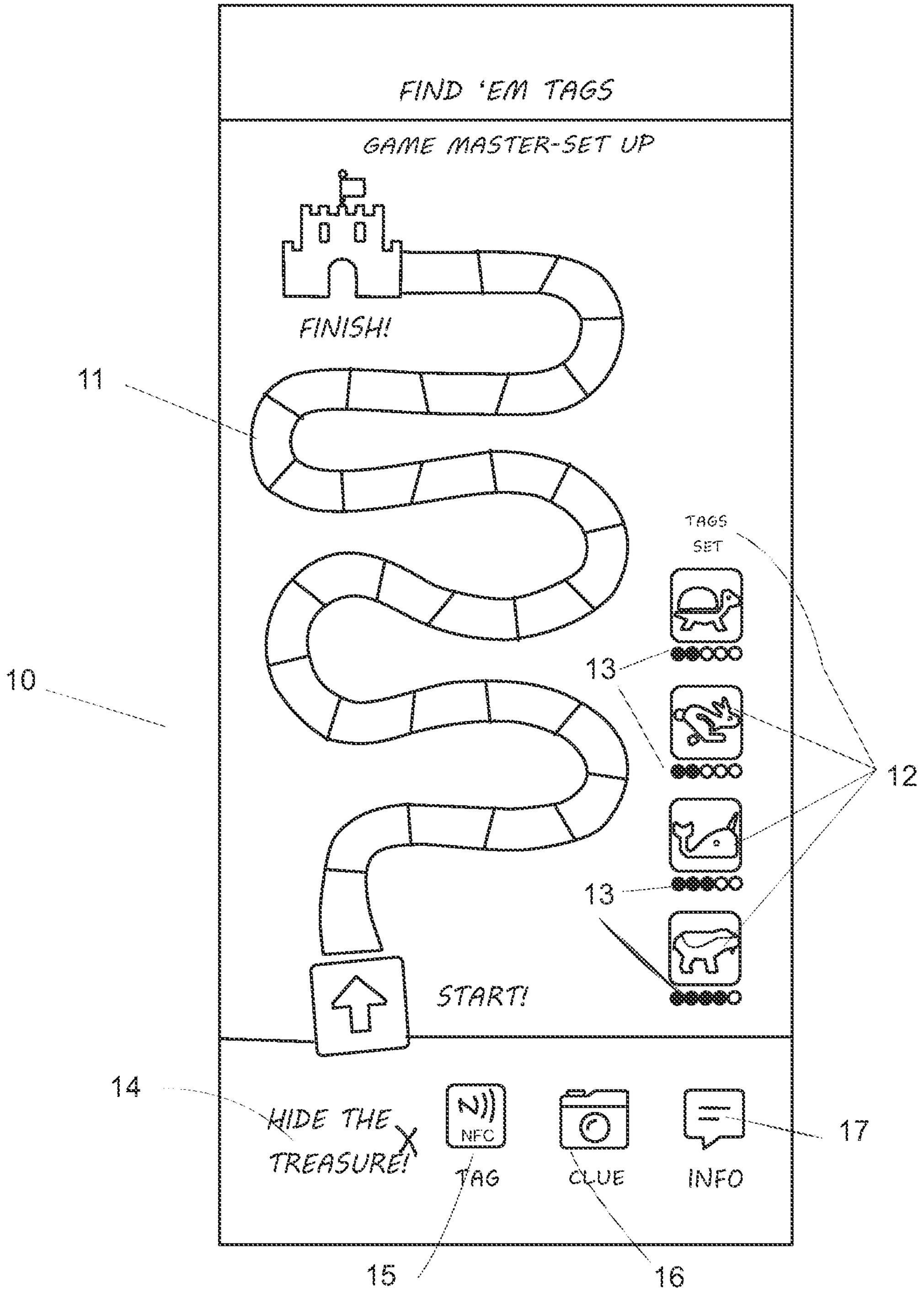
FIG. 1 is a detail view of a game master game board.

Referring now to the drawing figures, FIG. 1 is a detail view of a game master game board screen 10. This is a screen that only the game master can see. The screen 10 contains a game board 11 and the icons for the different teams 12. Below the team icon is a tracker 13 that shows how many containers have been successfully hidden for each team. These are indicated as solid dots, as shown.

The game master screen also has action buttons that serve the following purpose:

A "Hide the treasure" button 14 toggles between the game master screen and the game board (FIG. 2) screens. The "NFC tag" button 15 reads tags and programs bonus tags through the NFC chip reader in the user's smartphone. The "Clue" button 16 opens the smartphone camera to take a picture of the site, the app then allows the game master to add visual clues such as arrows, or other icons to the photo (see, e. g., FIGS. 3-5). The game master can then upload the photo directly through the app to the server back end. Uploading the photo automatically adds the GPS coordinates of the location where the photo was taken. After the upload, the game master selects a spot on the game board to indicate where the team lands after finding that container (see, e. g., FIG. 2). Finally, the info button 17 allows the game master to add messages to a bulletin board that shows on the game board screen.

Figure 2:
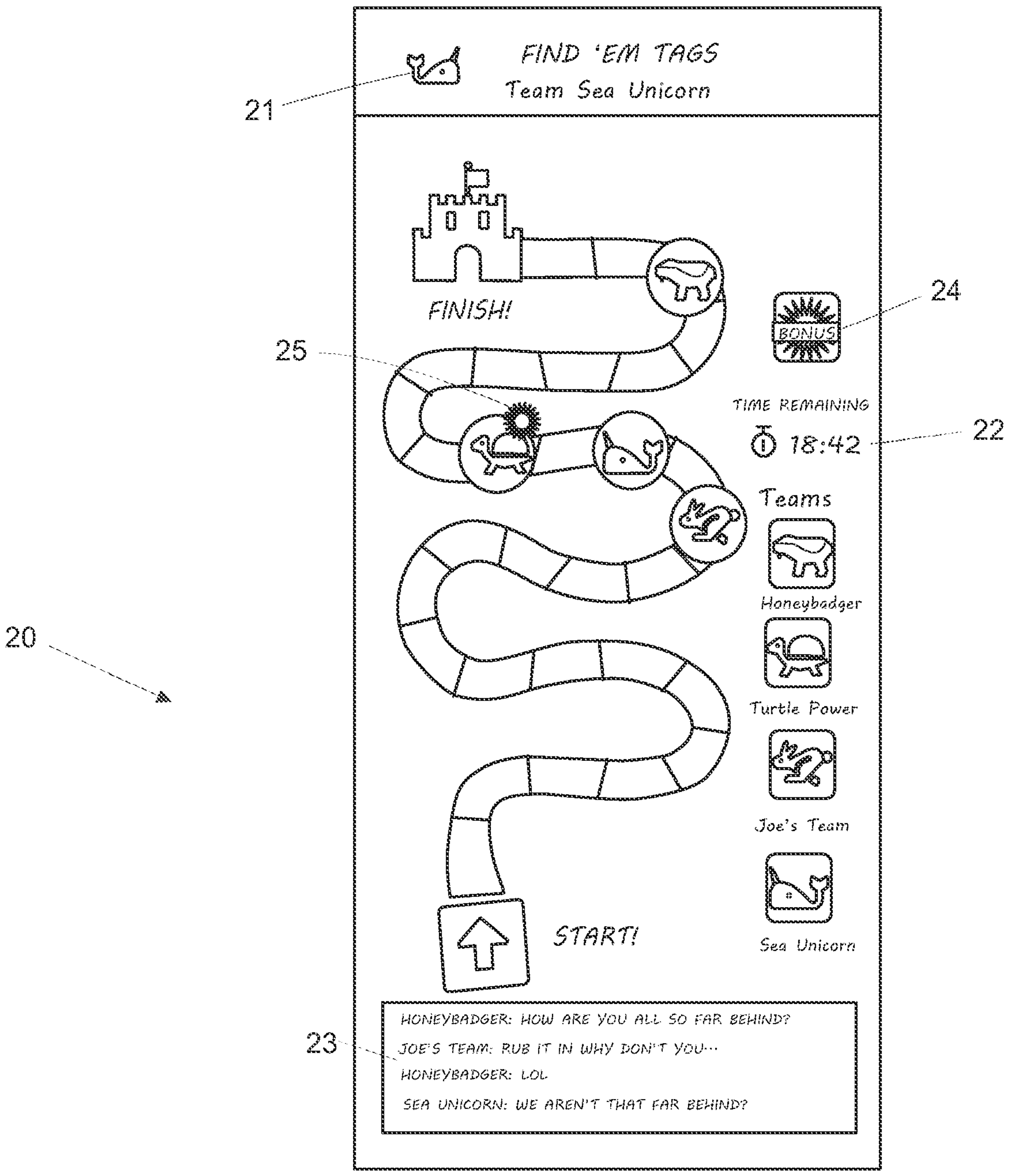
FIG. 2 is a detail view of a player game board.

FIG. 2 is a detail view of a player game board. This is the screen that all players and the game master can see. The game board 20 shows the progress of all the teams. In the top banner the name (or symbol) 21 of the team a player is on is indicated. In this figure, the team called "the Sea Unicorn team is shown.

Near the top of the screen the game clock 22 shows the amount of time remaining in the game. The bulletin board 23 allows the user to see messages that participants have added as well as notes from the game master. The Bonus icon 24 lights up if the game includes a bonus tag (see FIG. 3), and each team that finds the bonus tag gets a gold star 25 on their icon.

Figure 3:
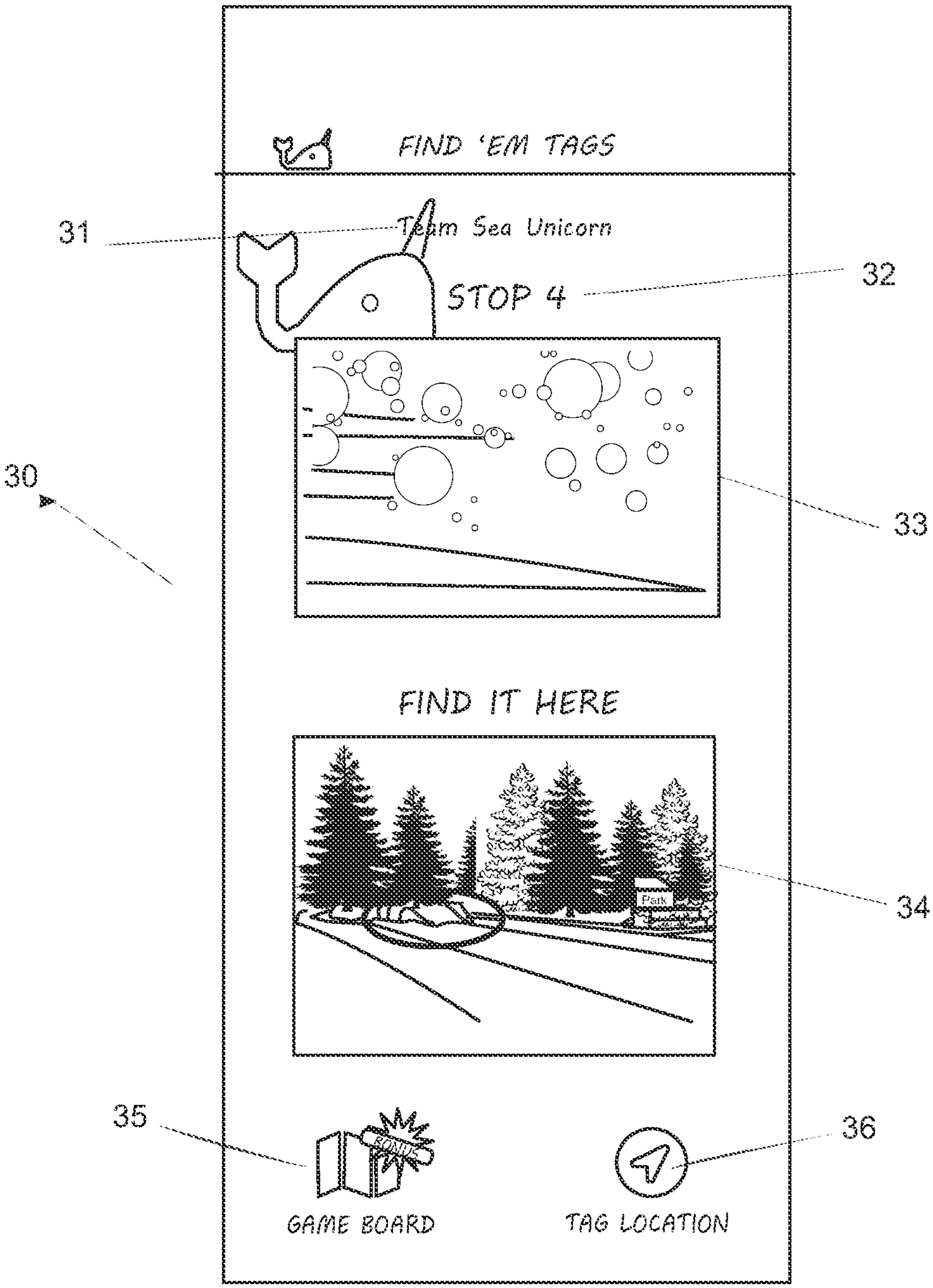
FIG. 3 is a detail view of a tag info page.

FIG. 3 is a detail view of a "tag info" page 30.

Each time a container is found, and the NFC tag is scanned, this page opens in the app. At the top of the tag is the team's name 31 that is registered to this particular course, the stop number 32, and the clues 33 and 34 to find the next tag. The picture 33 at the top, is a photo of the sticker on the next container. The second photo 34 is the uploaded picture of the hiding spot for the next container, with the visual clues.

A team or player must find the correct container to advance to the next screen. By matching the picture 33 to the sticker on the container the players ensure the container found is part of the team's course. If the players find another team's container, when it is scanned, no "tag info" page opens. Instead, a message pops up saying to return the cylinder to the hiding spot, as this is not that team's canister.

At the bottom of this screen is a "Game Board" button 35 that allows the user to toggle back to the game board view and see which square team has advanced to after scanning this tag. There is also a "Tag Location" button 36. When clicked, it provides the GPS location of the next hiding spot. This allows the user to use the smartphone's navigational capabilities as part of the search.

Figure 4:
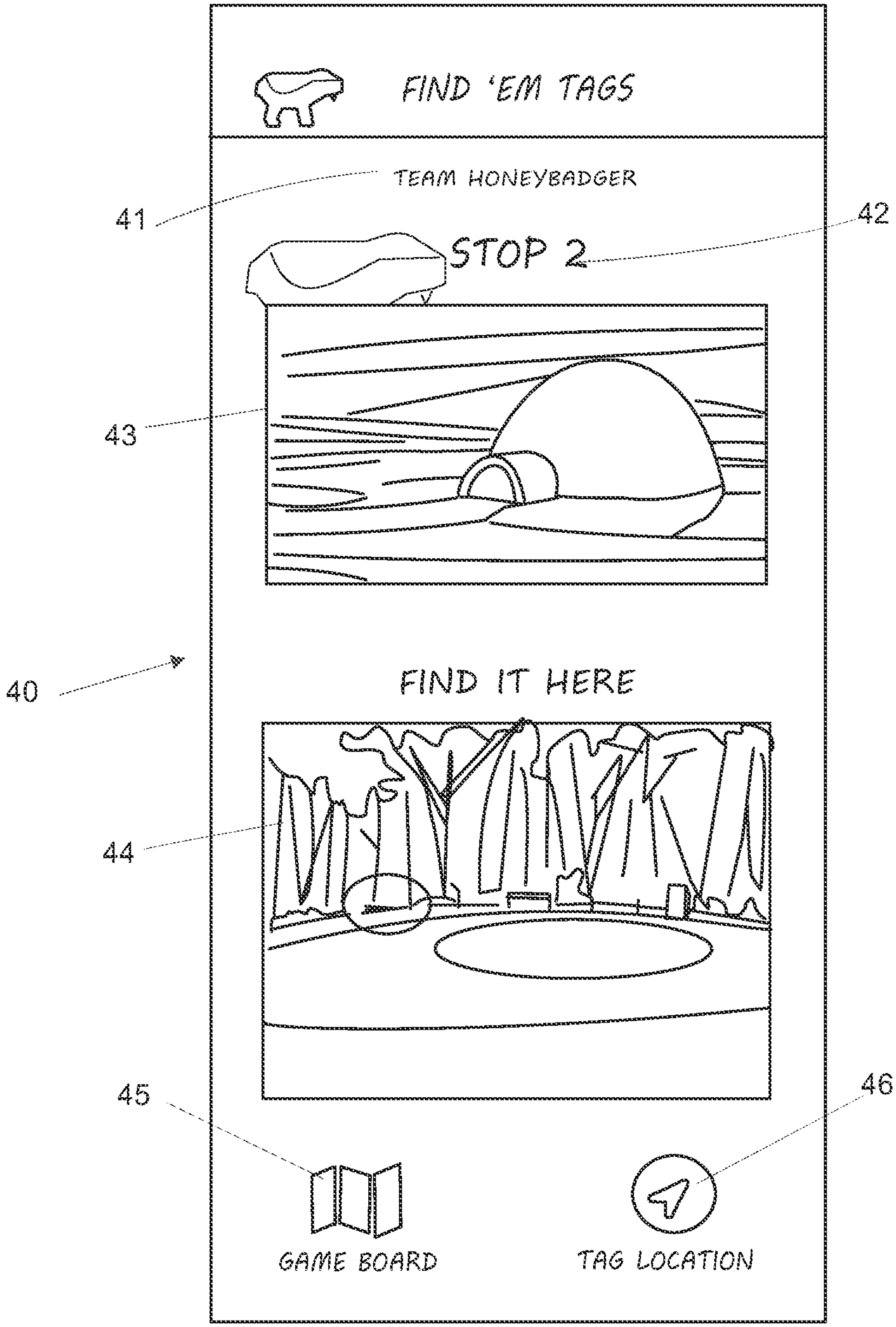
FIG. 4 is a detail view of another tag info page.

FIG. 4 is a detail view of another "tag clue" page 40. In this figure, a different team name 41 is shown. Also note a different stop number 42 is displayed. As before, there is a photo 43 of the sticker on the next canister along with a clue location photo 44. As before, the "Game Board" button 45 and "Tag Location" button 46 are present.

Figure 5:
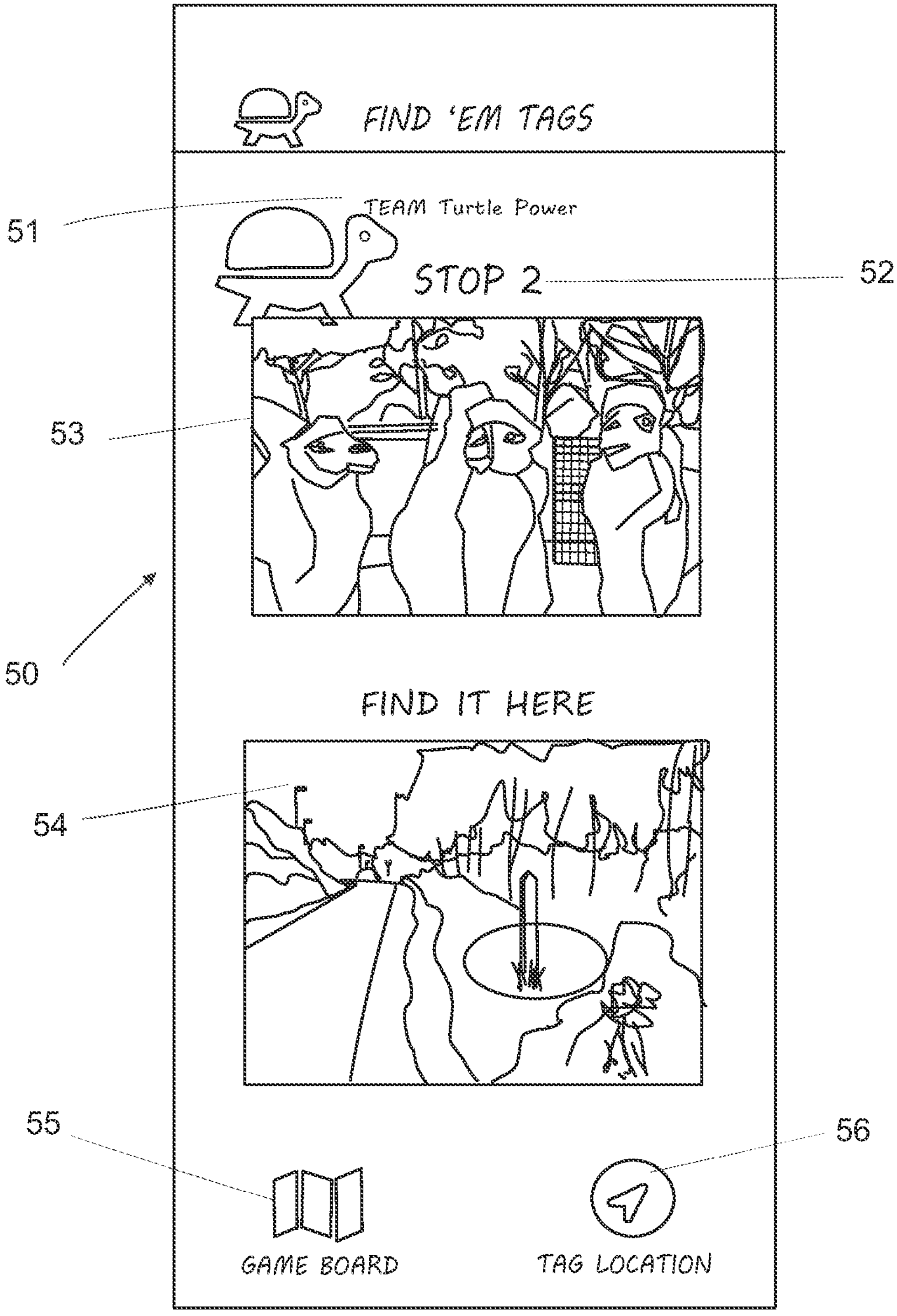
FIG. 5 is detail view of yet another tag info page.

FIG. 5 is detail view of yet another "tag info" page 50. Here, another team name 51 is shown. Also note a stop number 52 is displayed. As before, there is a photo 53 of the sticker on the next canister along with a clue location photo 54. As before, the "Game Board" button 55 and "Tag Location" button 56 are present.

Figure 6:
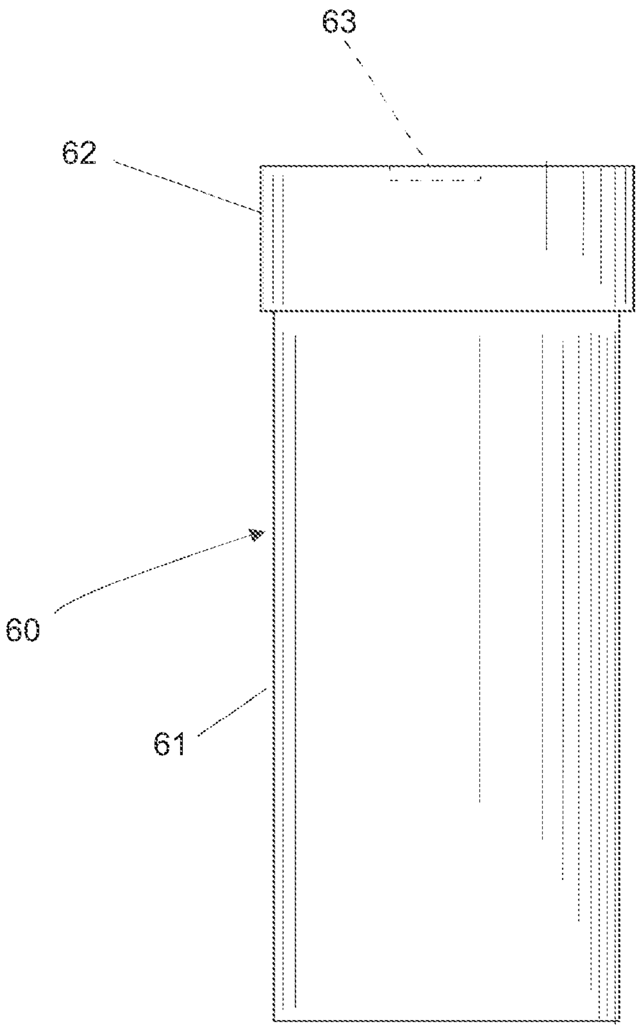
FIG. 6 is a side view of a tagged canister.

FIG. 6 is a side view of a tagged canister 60. The canister is plastic and is sized so that it can be nested with the other canisters in the set. The canister has a lower body 61, a top 62 and an NFC tag 63 embedded in the top.

Figure 7:
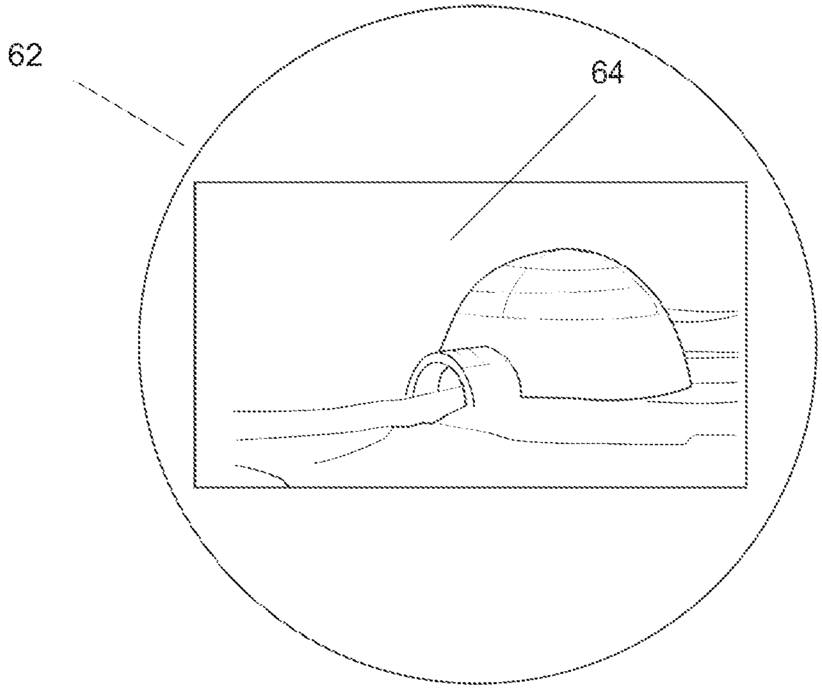
FIG. 7 is a top view of a tagged canister showing the identifying tag sticker.

FIG. 7 is a top view of a tagged canister 60 showing the identifying tag 64. As noted above, the canister lids 61 each have a sticker 64 that matches one of the photos found on the tag info pages. As the NFC tag is scanned, the location is noted, and the team moves on to the next location.

Because of the clues and the GPS coordinates, most teams find the canisters in order (e. g., 1-5). Note, if a container is found out of sequence, the team will advance to the square on the game board which correlates to the that container, but they run the risk of losing the game to another team that locates the containers in the proper sequence and finds the greater number of tags.

As noted above, the game ends when one team finds all the canisters assigned to that team and reaches the finish line, or when time runs out, in which case, the team with the most canisters identified wins.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A treasure hunt scavenger game comprising:
- a plurality of hollow plastic containers, each of said plurality of hollow plastic containers having a top, each of said plurality of containers also having a near field communication (NFC) tag embedded in the top of each of said plurality of containers;
- a game clock;
- a game master control board, said game master control board including:
  - a plurality of icons, each of said plurality of icons representing a team;
  - an NFC tag reader; and
  - a GPS reading of a location where each of the plurality of hollow plastic containers are hidden;
- a plurality of photographs, each of the photographs of a particular sticker on each of said plurality of hollow plastic containers;
- a plurality of photos of each of the locations where each of said plurality of hollow containers are located;
- a plurality of player's game boards each of said plurality of player's game boards include:
  - a visual display that shows the progress of each of the plurality of teams;
  - the icon of the team a player is on;
  - the game clock that shows an amount of time remaining in the game; and
  - a bulletin board that allows a user to see messages from other users and the game master.

2. The treasure hunt scavenger game of claim 1 further including an instruction booklet.

3. The treasure hunt scavenger game of claim 1 further including a code to register an app to that game kit.

4. The treasure hunt scavenger game of claim 1 wherein the game clock holds the total amount of time that the game master can host games.

5. The treasure hunt scavenger game of claim 1 wherein the game master board further includes a tracker associated with each of said plurality of icons that shows how many containers have been successfully hidden for each team.

6. The treasure hunt scavenger game of claim 5 wherein the tracker comprises a plurality of solid dots below each of said plurality of icons, whereby each solid dot represents a hollow plastic container that has been hidden.

7. The treasure hunt scavenger game of claim 1 wherein the game master board is contained in an app on an electronic device, upon which, it is displayed.

8. The treasure hunt scavenger game of claim 7 wherein the game master board and each of said plurality of player's game boards are screens displayed on said electronic device.

9. The treasure hunt scavenger game of claim 8 wherein the game master screen further includes:
- a button that toggles between the game master screen and each of said plurality of player's game board screens;
- an "NFC tag" button that reads tags through the NFC chip reader in the user's electronic device; and a "Clue" button that opens a camera in said electronic device to take a picture of the site in which one of said hollow plastic containers is hidden.

10. The treasure hunt scavenger game of claim 9 wherein said app provides an editing tool that allows the game master to add a plurality of visual clues such to one of said pictures.

11. The treasure hunt scavenger game of claim 10 wherein app adds a GPS coordinate of the location where said picture was taken.

12. The treasure hunt scavenger game of claim 9 further including an info button that allows the game master to add a plurality of messages to a bulletin board that shows on the game board screen.

13. The treasure hunt scavenger game of claim 9 further including a bonus icon that lights up if the game includes a bonus NFC tag.

14. The treasure hunt scavenger game of claim 13 whereby each team that finds the bonus NFC tag gets a gold star displayed on the icon that represents that team.

15. The treasure hunt scavenger game of claim 1 further including a bonus NFC tag for said plurality of teams to find.

16. A treasure hunt scavenger game comprising:

a plurality of objects, each of the plurality of objects having a near field communication (NFC) tag embedded in the object and an identifying sticker adhered to the object;

a game master control board, the game master control board including:

a plurality of team indicators, each of the plurality of team indicators representing a team of a plurality of teams;

an NFC tag reader; and a GPS reading of a location where each of the plurality of objects is hidden;

a plurality of images of the identifying sticker of each of the plurality of objects;

a plurality of images of the locations of each of the plurality of objects; and a plurality of player's game boards, each of the plurality of player's game boards includes:

a team indicator representing one of the plurality of teams;

a visual display that shows a progress of each of the plurality of teams;

a display of an amount of time remaining in the game; and a bulletin board for sending and receiving messages to and from players and the game master.

17. The treasure hunt scavenger game of claim 16, wherein the game master board further includes a tracker associated with each of the plurality of indicators that shows a quantity of objects hidden for at least one team.

18. The treasure hunt scavenger game of claim 16 wherein the game master board further includes a button that toggles between a game master screen and a screen of each of said plurality of player's game boards.

19. A treasure hunt scavenger game comprising:

a plurality of objects, each of the plurality of objects having a near field communication (NFC) tag embedded in the object and a visual identifier associated with the object;

a game master control board, the game master control board including:

a plurality of team indicators on a game master screen, each of the plurality of team indicators representing a team of a plurality of teams;

a tracker associated with each of said plurality of team indicators that shows a quantity of objects hidden for each team;

a button that toggles between the game master screen and a screen of each of a plurality of player's game boards;

an NFC tag reader; and a GPS reading of a location where each of the plurality of objects is hidden; and wherein each of the plurality of player's game boards includes:

a visual display that shows a progress of at least one team of the plurality of teams;

a display of an amount of time remaining in the game; and a messaging utility for sending and receiving messages to and from players and the game master.

20. The treasure hunt scavenger game of claim 19, further comprising:

a plurality of images of identifying stickers adhered to each of the plurality of objects; and a plurality of images of the locations of each of the plurality of objects.

* * * * *